(12) United States Patent
Gu et al.

(10) Patent No.: US 7,218,760 B2
(45) Date of Patent: May 15, 2007

(54) STEREO-COUPLED FACE SHAPE REGISTRATION

(75) Inventors: Lie Gu, Pittsburg, PA (US); Li Ziqing, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 10/610,494

(22) Filed: Jun. 30, 2003

(65) Prior Publication Data

US 2004/0264745 A1 Dec. 30, 2004

(51) Int. Cl.
*G06K 9/00* (2006.01)
(52) U.S. Cl. .................................. 382/118; 382/190
(58) Field of Classification Search ............... 382/118, 382/151, 154, 159, 190, 199, 209, 218, 294, 382/309; 345/419
See application file for complete search history.

(56) References Cited

U.S. PATENT DOCUMENTS

| | | | |
|---|---|---|---|
| 6,181,806 B1 * | 1/2001 | Kado et al. ............... | 382/118 |
| 6,301,370 B1 * | 10/2001 | Steffens et al. ........... | 382/103 |
| 6,611,613 B1 * | 8/2003 | Kang et al. .............. | 382/118 |
| 2002/0102010 A1 | 8/2002 | Lin et al. | |

OTHER PUBLICATIONS

Yang, et al "Model-Based Head Pose Tracking With Stereovision", IEEE, pp. 242-247, May 2002.*
Lin, et al "Extracting 3D facial animation parameters from multiview video clips", IEEE, pp. 72-80, Dec. 2002.*
Minagawa T et al. "Face-direction estimating system using stereo vision", Industrial Electronics, Control and Instrumentation, 1997, IECON 97. 23rd International Conference on New Orleans, LA USA. Nov. 9 1997, IEEE vol. 3 pp. 1454-1459.
Cootes, T.F., et al., "Active Shape Models—Their Training and Application," Computer Vision and Image Understanding, vol. 61, No. 1, Jan. 1995, pp. 38-59.
S.Z. Li, Q.D. Fu, L. Gu, B. Scholkopf, Y.M. Cheng, H.J. Zhang. "Kernel Machine Based Learning for Multi-View Face Detection and Pose Estimation". In Proceedings of 8th IEEE International Conference on Computer Vision. Vancouver, Canada. Jul. 9-12, 2001.
Z. Zhang, Determining the Epipolar Geometry and its Uncertainty: A Review. The International Journal of Computer Vision, 27(2):161-195, 1998.

* cited by examiner

*Primary Examiner*—Daniel Miriam
(74) *Attorney, Agent, or Firm*—Lee & Hayes, PLLC

(57) ABSTRACT

A face model having outer and inner facial features is matched to that of first and second models. Each facial feature of the first and second models is represented by plurality of points that are adjusted for each matching outer and inner facial feature of the first and second models using 1) the corresponding epipolar constraint for the inner features of the first and second models. 2) Local grey-level structure of both outer and inner features of the first and second models. The matching and the adjusting are repeated, for each of the first and second models, until the points for each of the outer and inner facial features on the respective first and second models that are found to match that of the face model have a relative offset there between of not greater than a predetermined convergence tolerance. The inner facial features can include a pair of eyes, a nose and a mouth. The outer facial features can include a pair of eyebrows and a silhouette of the jaw, chin, and cheeks.

55 Claims, 10 Drawing Sheets

$S_{in}$

+

$S_{out}$

=

$S$ $\lambda = \nu - \mu'$

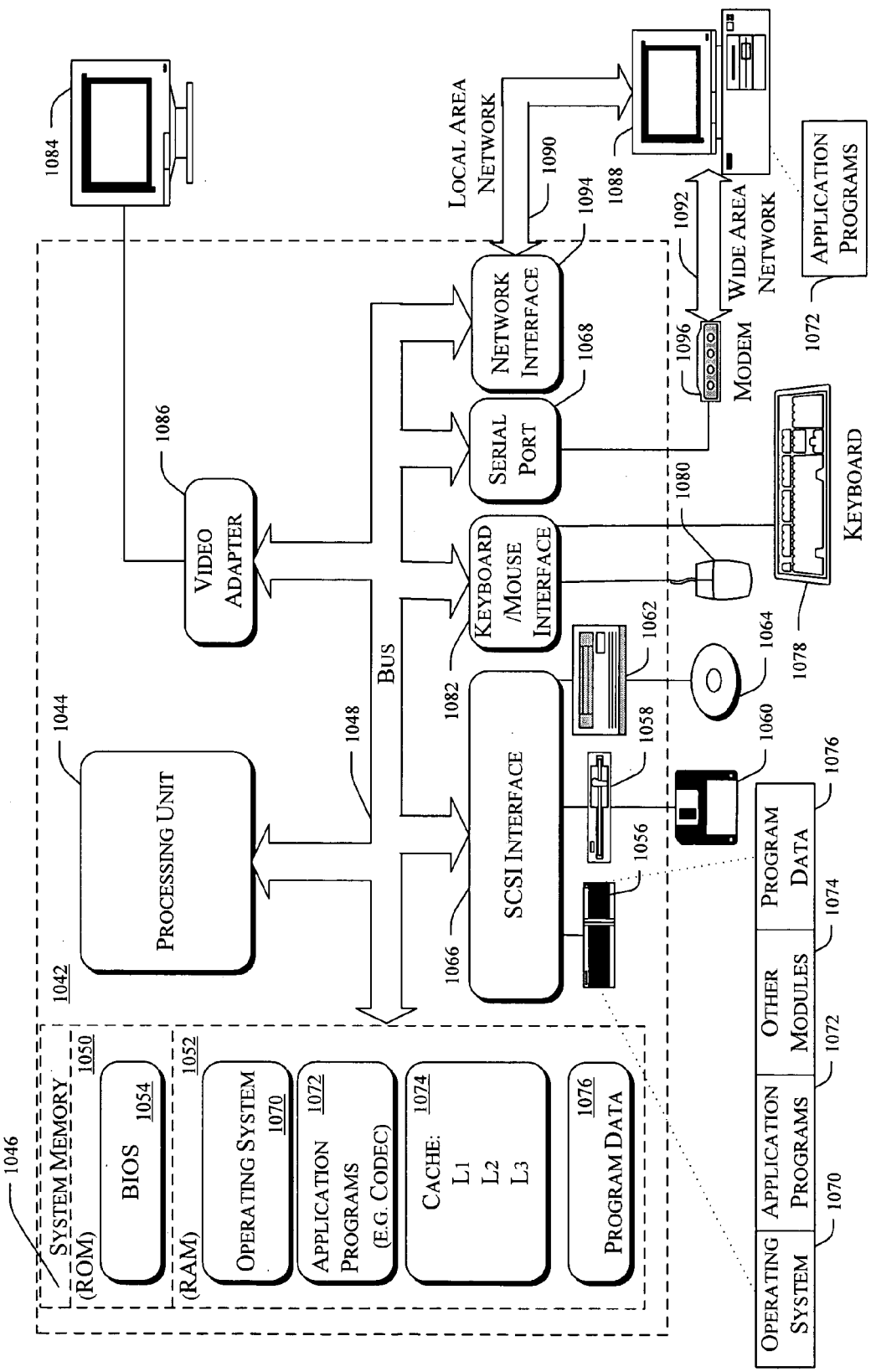

STEREO-COUPLED FACE SHAPE REGISTRATION

TECHNICAL FIELD

This invention is directed towards face recognition and more particularly relates to recognizing facial features by locating points on the facial features using multiple images of a face.

BACKGROUND

A three dimensional object can be represented in two dimensions. In fact, representing a three-dimensional object by using two-dimensional views has advantages in object modeling and synthesis. In such two-dimensional representations, the three-dimensional features of the object need not be explicitly recovered and this avoids difficulties in three-dimension based methods. Rather, it is conventional to use view-based models to represent the object with multiple two-dimensional view projections. When representing an object with more than one two-dimensional view, a pixel-wise correspondence map is usually required between each of the two-dimensional views. Alternatively, a sparse correspondence map between a small set of feature points, or edges of features, on the object can be used between each of the two-dimensional views. The correspondence map can be computed and applied to separate the shape of the object from the texture of the object. As such, both the shape of the object and the texture of the object, from a particular viewpoint, can be modeled in a linear subspace.

When representing an object with more than one two-dimensional view, it may be advantageous to establish points to represent features on the object (feature points). A feature point based correspondence between multiple two-dimensional views is advantageous in some applications because it is more robust in dealing with light intensity and color variations, and can involve less computation than establishing a dense representation of the object. Accordingly, to accurately model an image class of an object, two problems can be addressed and solved. The first problem is that of locating feature points on features of the object by using a training set of two-dimensional views. Once the feature points of the features on the object are located, the second problem is that of establishing the underlying correspondence between two or more sets of feature points from a corresponding number of two-dimensional views.

An additional degree of difficulty arises when locating features in a complex and non-rigid object using multiple two-dimensional views. These difficulties can be addressed by using prior knowledge regarding the object itself. For instance, a deformable model of the object is an example of such prior knowledge. The deformable model can provide constraints on the location of features on the object. These constraints, which can be derived from image data with respect to the object, can be used to deal with the problems like segmentation of the object or the detection of features on the object. In particular, the Active Shape Model (ASM) as proposed by Cootes et al. (Active Shape Model, T. F. Cootes, C. Taylor, D. Cooper, and J. Graham. Active shape models—their training and their applications. Computer Vision and Image Understanding, 61(1):38–59, January 1995) provided the advantage that the instances of the model of the object can be deformed only in those ways that were learned from the training set from which the model was derived. That is, the model can accommodate considerable variability in segmentation of the object, or in the detection of its features, but the model should still be specific to the class of the object that the model represents. ASM uses the Principle Component Analysis technique (PCA) to model an object by both the two-dimensional shape variations of the object and the local grey level structures of the object. In particular, ASM is a process that includes interrogating two-dimensional images of the object and approximating the shape of features on the object using points (feature points) that respectively represent each feature on the object.

When two or more different two-dimensional views of the same object are given, the features on the object for each view can be matched to a model of the object by using ASM. After the model matching for each view is performed, it would be desirable to find the correspondence between the respective feature points of the features of the object for the different views, such as by implication across each of the different views. The detected feature points for each feature on the object, however, may not be geometrically consistent across the different views. This inconsistency occurs because ASM only considers a single view rather than the correspondence between the different views. The matching of the model to each of the different views could benefit from the use of a multi-view geometry. While this can be accomplished, it requires that all key feature points of each feature on the object remain visible in each of the two-dimensional views.

One technique for using ASM involves using a set of training examples of one face view from different viewpoints. From these views of the one face, a set of feature points of facial features on the face can be manually labeled. This manual labeling represents a deformation of the face into its different facial features and respective points that make up the facial features. For instance, these features can include the nose, eyes and mouth. The feature points are those points that mark the facial features on the face. ASM uses the set of training data representing the deformation of the face to analyze facial features on a different face by using views of the different face. This conventional ASM technique, however, suffers from inaccuracy in locating facial features in the views of the face being analyzed. Moreover, the conventional ASM technique can only deform the face being analyzed in the ways that the face in the set of training data had been deformed. One partial solution to overcome the inherent inaccuracy is to use a larger training database. Such a solution is only partial because it does not take into consideration the local grey-level model fitting for the different views of the face. Local grey-level model fitting tends to interpret the data so as to move facial features toward the strongest photometric edge, which may not necessarily be the actual edge of a facial feature—thus introducing further inaccuracy. Moreover, using a larger training database may further decrease accuracy because the additional data tends to further extend the acceptable facial feature shapes into an inaccurate range for the face being analyzed.

In addition to the foregoing problems, ASM is not consistent in finding the same facial features in two slightly different views of the same face. ASM does not always guarantee that the features identified in training data for a training object will yield similar features when searching two slightly different views of another object. This inability can be attributed to illumination changes in the object as a result of rotating the object in different two-dimensional views, or it can be attributed to different initial parameters. Two negative results can occurs when using conventional ASM in this environment. One result is that the conventional ASM model will wrongly identify features on an object or will inaccuracy locate the feature points for features on the object. Either way, different two-dimensional views of the same object, when using conventional ASM, will yield features that do not match up between the different two-dimensional views. In consequence, the correspondence between the identified features of the different views is inaccurate when using conventional ASM.

If would be an advance in the art to develop a technique that will accurately and consistently identify the same features in different views of the same object.

SUMMARY

An implementation of the invention identifies facial features by locating points for the facial features, such as eye corners and nose tip. To do so, a training set of multiple two-dimensional views of a face are used to develop a set of training data. The set of training data is used with two different two-dimensional views of a face in a mathematical model. The mathematical model is used to identify both inner and outer facial features on the two different two-dimensional views, thus presenting a stereo-coupling mechanism for identifying facial features on each of the two different views of the face. The mathematical model uses epipolar geometry as encoded within a fundamental matrix to constraint the regions on each of the two different views at which facial features will be located. The mathematical model finds a geometric correspondence between the points for each facial feature, respectively, on each of the two different views of the same face.

In another implementation of the invention, outer and inner facial features of a face model are matched with that of a first model for a first face image and with that of a second model for a second face image. Each of the matching outer and inner facial features of the first and second models is adjusted using the corresponding epipolar constraint for the first and second models. The first and second face images are images the same face captured at the substantially the same respective camera orientation. In other implementations, the images have a face pose range differing by the yaw.

In yet another implementation of the invention, an initialization is performed by using a face model for first and second models for respective first and second face images. Each of the first and second models has outer and inner facial features defined by a plurality points. A fundamental matrix is estimated for the first and second models. The points are updated for each of the inner facial features of the first and second models by using the respective local texture for each point. Each of the inner facial features of the first and second models is then updated. The points for each of the inner facial features of the first and second models are updated using the fundamental matrix and the corresponding epipolar constraint. An update is then performed for each of the outer facial features of the first and second models. If the first model has converged within a predetermined tolerance of the face model, a representation is output of the inner and outer facial features of the first model. If the second model has converged within a predetermined tolerance of the face model, a representation of the inner and outer facial features of the second model is output.

BRIEF DESCRIPTION OF THE DRAWINGS

A more complete understanding of the implementations may be had by reference to the following detailed description when taken in conjunction with the accompanying drawings wherein:

FIG. 10 is a block diagram, in accordance with an implementation, of a networked computer that can be used to implement either a server or a client.

DETAILED DESCRIPTION

The present invention is directed towards face modeling and identification of facial features. Implementations of the present invention use epipolar geometry in face shape analysis to determine facial features, such as the nose, eyes, eye brows, mouth, etc. This detailed description presumes that the reader has an understanding of epipolar geometry.

Estimating the Fundamental Matrix

Figure 1A:
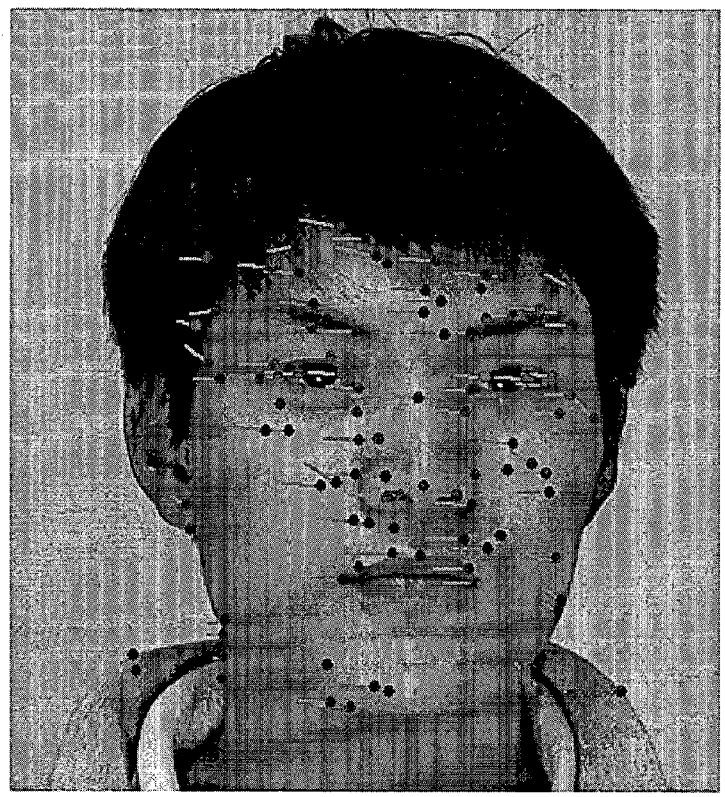
FIGS. 1a–1b illustrates a mechanism for matching corners of different facial features by points that form an outline around each facial feature on two different two-dimensional views of the same face, where the face is in two (2) different positions, and where the mechanism uses a fundamental matrix estimation.
Figure 1B:
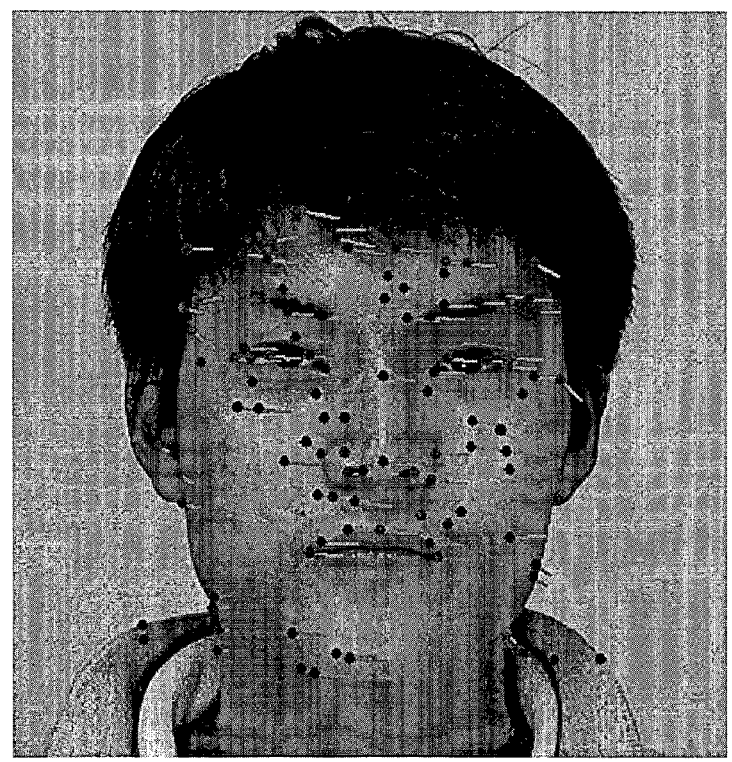
Figure 2:
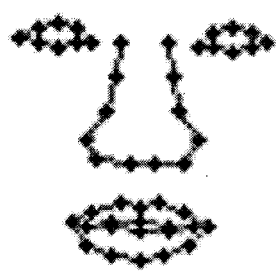
FIG. 2 illustrates a decomposition of a face into inner and outer facial features, each being outlined by a line connecting a plurality of points.
Figure 2:
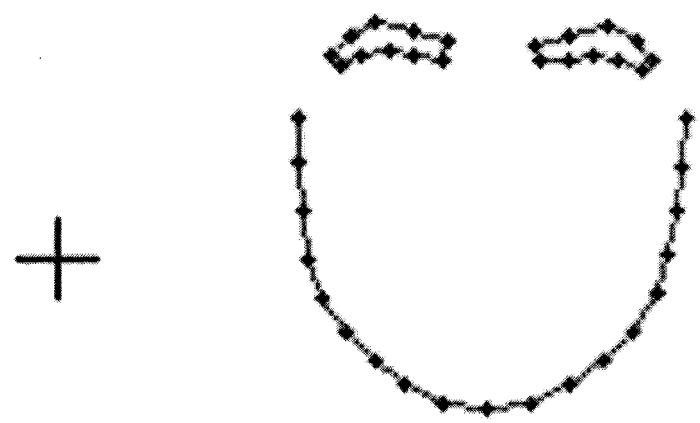
Figure 2:
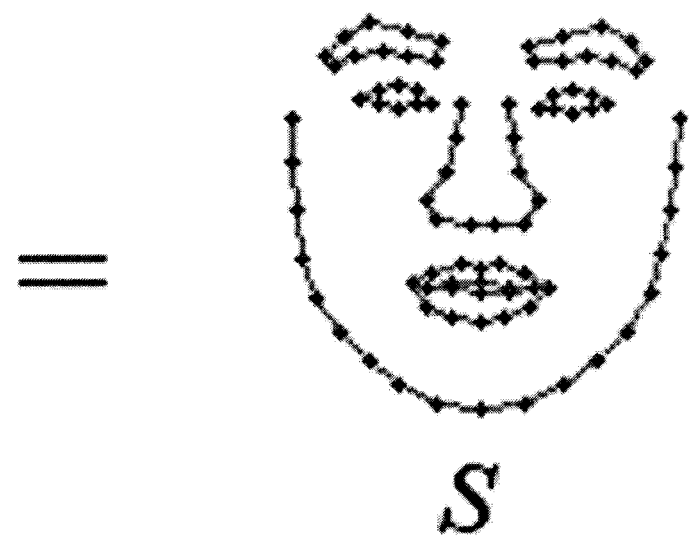

FIGS. 1a–1b show two target images that are calibrated by an estimate of the fundamental matrix E between them. One example of a formula for computing the fundamental matrix E for a pair of images is given by Zhang et al. (Z. Zhang, Determining the epipolar geometry and its uncertainty: a review. The International Journal of Computer Vision, 27(2):161–195, 1998). The two images are taken by a static camera while the head is in a frontal position and moving in the yaw direction between the two views. Because the illumination changes when the head is rotating, the color of the same physical point in the two images appears to be different. As such, it is advantageous to identify facial features of the face because the identification of facial features is more robust to intensity variations than optical flow based methods. The estimation of the fundamental matrix E can include four (4) different steps: 1) approximate the localization of faces by determining differences between the two different images; 2) detect the corners of each facial feature in the images; 3) match the corners of each facial feature by a correlation between the two different images; and 4) reject the false matches and estimate the fundamental matrix by least median squares. FIGS. 1a–1b shows a pair of face images and the set of corner matches for facial features that are established with this technique. Nevertheless, a face model is needed for more accurate correlation of facial features between the two different images. Such a face model, as shown in FIG. 2 and discussed below, is a representation of facial features, e.g., nose, eyes, eye brows, mouth, etc.

Decomposition of a Face Shape Model

A training set of face shapes, $T=\{S_i|i\in 0\sim N\}$ can be provided, where a shape vector is represented by $S_i=(<x_1,y_1>, <x_2,y_2>, \ldots, <x_K,y_K>) \in R^{2K}$, $K=83$. $S_i$, a shape vector, represents the points that make up different features on a face (feature points). As seen in FIG. 2, a face has been decomposed into inner facial features (eyes, nose, and mouth), each of which is seen outlined by a line connecting a plurality of points. FIG. 2 shows 63 points that make up these three different inner facial features. The face has also been decomposed into outer facial features (a pair of eyebrows and a silhouette of the jaw, chin, and cheeks), each of which is seen outlined by a line connecting a plurality of points. FIG. 2 shows 19 points that make up these two different outer facial features. As such, a total of 83 points make up five (5) different facial features as seen in the composite of the decomposed facial features at the bottom of FIG. 2.

The points on the silhouette are helpful since they can help segment the region of the face from its background. Due to the self occlusion introduced by head rotation in the yaw direction, however, the points on the silhouette are difficult to accurately associate to two different views of the same face in that these points will not comply with the epipolar constraint. To overcome this difficulty, the decomposed face model is used. As showed in FIG. 2, the shape vector $S_i$ is divided into two parts, the inner vector $S_{in}$ and the outer vector $S_{out}$. $S_{in}$ denotes the 64 points that make up the three inside facial features and outer vector $S_{out}$ denotes the other 19 points that define the eye brows and the silhouette or face contour. Of course, a different number of points could be selected to represent each of the facial features. Another reason to separate out the silhouette of the jaw, chin, and cheeks is due to the fact that their local grey-level model is less stable than the points that make up the three inner facial features, if the backgrounds that are presented in the training images are cluttered. Considering that the periphery of the eyebrows are more difficult to detect than other inner facial features, and are more likely to be affected by other factors such as by different hairstyles, the eyebrows are also assigned the $S_{out}$ shape vector.

After aligning all shape vectors ($S_{in}$, $S_{out}$) to the tangent space of the mean shape $\bar{S}$ in an iterative ASM procedure, a set of normalized shape vectors $S_i=T_{X_1,Y_1,S,\theta}(\hat{S}_i)$ is obtained, where T represents a Euclidean transformation by performing a rotation $\theta$, a scaling S and a translation by $(X_1,Y_1)$. An example of such an iterative ASM procedure that can be used is given by Cootes et al., discussed above, Following the decomposition strategy, each aligned face $\hat{S}_i$ is decoupled into two vectors $\hat{S}_i=<\hat{S}_{in},\hat{S}_{out}>$. Two low dimensional shape spaces, $U_F$ and $U_{in}$, are computed using the Principle Component Analysis technique (PCA) of ASM as $\hat{S}_i=\bar{S}+U_Fb_i$, $\hat{S}_{in}=\bar{S}_{in}+U_{in}b_{ini}$, where $U_F$ is the matrix consisting of k principal modes of variations in $\hat{S}_i$ and $U_{in}$ is the one learnt from $\hat{S}_{in}$. For each point j of each facial feature in the shape i of the training set, a gray level profile $g_{ij}$ centered around the j is extracted. The derivation vector $d_{ij}$ of $g_{ij}$ is calculated and normalized as: $\hat{d}_{ij}=d_{ij}/\Sigma_k d_{ij,k}$, where k is the index of points along the profile. PCA is used again to model the variation of the vectors $\hat{d}_{ij}$. One example of the PCA of ASM, as used herein, is given in Cootes et al., discussed above.

Stereo-Coupled Model Searching

A stereo-coupled model of matching corresponding facial features of two views of the same face starts with an initial guess of the face position and the mean shape vector in both images. ASM is applied to each of the two views to update each point of each facial feature according to local texture statistics (e.g., photometric data proximal each point). To do so, the points are moved along a direction that is perpendicular to the model boundary. The quality of the fit is then evaluated, and from this, a new position for each point can be proposed. The best match is often found on a strong edge based upon the magnitude of the photometric data.

The next step involves finding the most plausible shape which satisfies both the prior shape distribution and the epipolar constraint. Model fitting can be formulated as finding the optimal parameter set c of the shape models in the two images, to minimize a loss function L(c) with two constraints, i.e., $$L(c) = \left\|S_{in1} - \hat{S}_{in1}\right\|^2 + \left\|S_{in2} - \hat{S}_{in2}\right\|^2 \quad (1)$$

$$= \sum_i (d(\mu_i, \hat{\mu}_i)^2 + d(\mu'_i, \hat{\mu}'_i)^2) \quad (2)$$

subject to the constraints $$\hat{\mu}'^T E \hat{\mu} = 0 \quad (3)$$

$$|b_{i,k}| \leq 3\sqrt{\lambda_k} \quad (4)$$

where d(x,y) is the Euclidean distance between points x and y, $S_{in1}$ and $S_{in2}$ are observed feature points after local texture based updating, $$S_{in1}=\{\mu_i|\mu_i=<x_{in,i},y_{in,i}>,i=0\sim 63\}$$

$$S_{in2}=\{\mu'_i|\mu'_i=<x_{in,i}',y_{in,i}'>,i=0\sim 63\}$$

and $\hat{S}_{in1}$ and $\hat{S}_{in2}$ denote the model instances:

$$\hat{S}_{in1}=T_{in1}(\bar{S}_{in}+U_{in}b_{in1}) \quad (5)$$

$$\hat{S}_{in2}=T_{in2}(\bar{S}_{in}+U_{in}b_{in2}) \quad (6)$$

The parameters $b_{in1}$ and $b_{in2}$ should satisfy the second conditions to generate a desirably accurate face shape.

L(c) is used to evaluate the difference between model instances and observed feature points. Alternatively, in terms of the epipolar geometry, L(c) can also be viewed as a measure to find the correct corresponding points. During the searching procedure, a typical observed matching $\mu \Leftrightarrow \mu'$ among the shapes $S_{in1}, S_{in2}$ can be noisy and there it is desirable to recover the correct one. L(c) denotes the distance between original feature points $\mu$, $\mu'$ and correct corresponding points $\hat{\mu}$, $\hat{\mu}'$ where $\hat{\mu}$, $\hat{\mu}'$ are the points in the shape instances $\hat{S}_{in1}$, $\hat{S}_{in2}$. An assumption is made that there will be a Gaussian error distribution of $\mu$, $\mu'$ on the points $\hat{\mu}$, $\hat{\mu}'$, which will in turn minimize the loss function L(c) for the most likely values that will represent an accurate correspondence between points on the two different views.

A procedure for locating an accurate correspondence between points on the two different views involves the decomposition of a shape model and the combined constraints of both epipolar constraint (e.q.3) and prior shape constraint (e.q.4). In general, such a procedure begins by initializing shape models on two different views of the same face in terms of face detection results. An example of the initialization of shape models on two different views that can be used herein is given in Li et al. (S. Z. Li, Q. D. Fu, L. Gu, B. Scholkopf, Y. M. Cheng, H. J. Zhang. "Kernel Machine Based Learning for Multi-View Face Detection and Pose Estimation". In Proceedings of 8th IEEE International Conference on Computer Vision. Vancouver, Canada. Jul. 9–12, 2001). After the shape models of the different views have been initialized, the points for each facial feature are updated independently using the texture (e.g., photometric data) proximal to each point. Then, the inner shape image is updated. To do, an initial estimate is given for the inner shape vectors $S_{in1}$, $S_{in2}$. This initial estimate is fitted to the image data for the two different views of the face. An optimization is sought for parameters of $T_{in1}, T_{in2}, b_{in1}, b_{in2}$ and a truncation of $b_{in1}$, $b_{in2}$ is made within $\pm 3\sqrt{\lambda_k}$ according to the prior shape constraint. After the truncation, an update is made to the points for the inner facial features (nose, eyes, and mouth) according to the epipolar constraint.

Figure 4A:
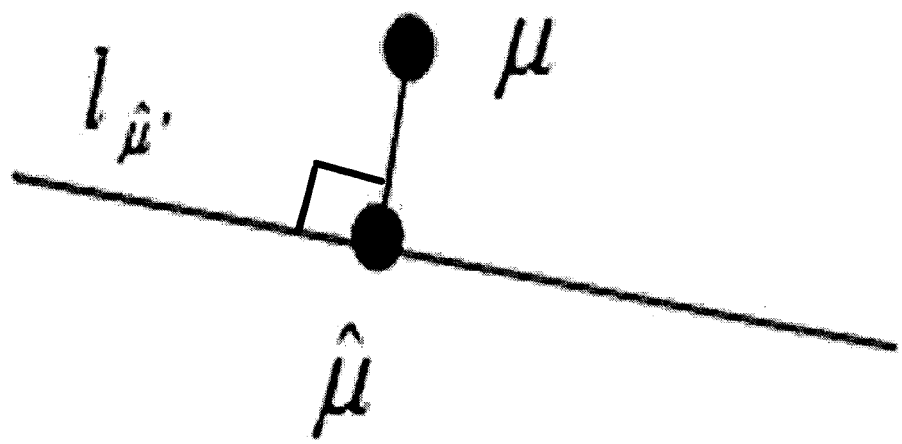
FIGS. 4a–4a are epipolar geometric illustrations depicting the correspondence between points on two different two-dimensional views of an image in accordance with an implementation of the invention.
Figure 4B:
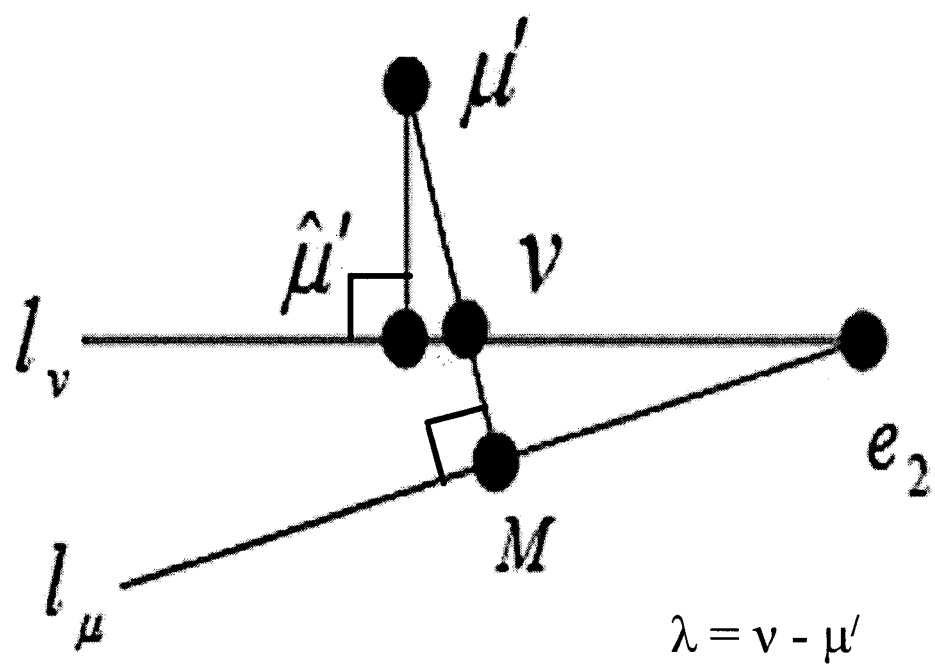

Since the points for the inner facial features for the two different views may not as yet satisfy the epipolar constraint, a nonlinear optimization solution is introduced to find the correct correspondence of $\hat{\mu} \leftrightarrows \hat{\mu}'$ from the matching of $\mu \leftrightarrows \mu'$. As shown by the epipolar geometric diagrams seen in FIGS. 4a–4b, $l_\mu$ is the epipolar line of feature point $\mu$ in the second view or image of the same face. A line $l_\perp$ is drawn orthogonal to $l_\mu$ from $\mu'$, which intersects $l_\mu$ at point M. A line $l_v$ going from $e_2$ through a point v on $l_\perp$ is an epipolar line. Thus, point v defines the pencil of epipolar lines in the second image. The pencil can be parameterized by a parameter $\lambda$, which is the signed distance between v and $\mu'$. The parameter $\mu'$ is projected to $l_v$ to obtain $\hat{\mu}'$. The parameter $l_{\hat{\mu}'}$ is the epipolar line of $\hat{\mu}'$, in the first view or image of the same face. The parameter $\mu$ is projected to $l_{\hat{\mu}'}$ to obtain $\hat{\mu}$. In order to find the optimal $\lambda_{opt}$ to minimize L(c) as (2), a classical Levenberg-Marquardt optimizer can be used, were the initial value of $\lambda$ is set to $\frac{1}{2}d(\mu,M)$. Several iterations can be made in order to achieve an optimal value of $\lambda$. Lastly, all points $S_1, S_2$ for all facial features are updated as was done in the first step.

Generally, the shape of a face is approximated, in one implementation, by the foregoing steps so as to minimize an internal energy function. The epipolar constraint represents a special energy term that aims at finding the best correspondence between the points of the facial features for each of the two different two-dimensional views of the same face.

Figure 3A:
FIGS. 3a–3b show respective two-dimensional views of a face in different poses, where the views represent starting images that can be used by implementations of the invention.
Figure 3B:
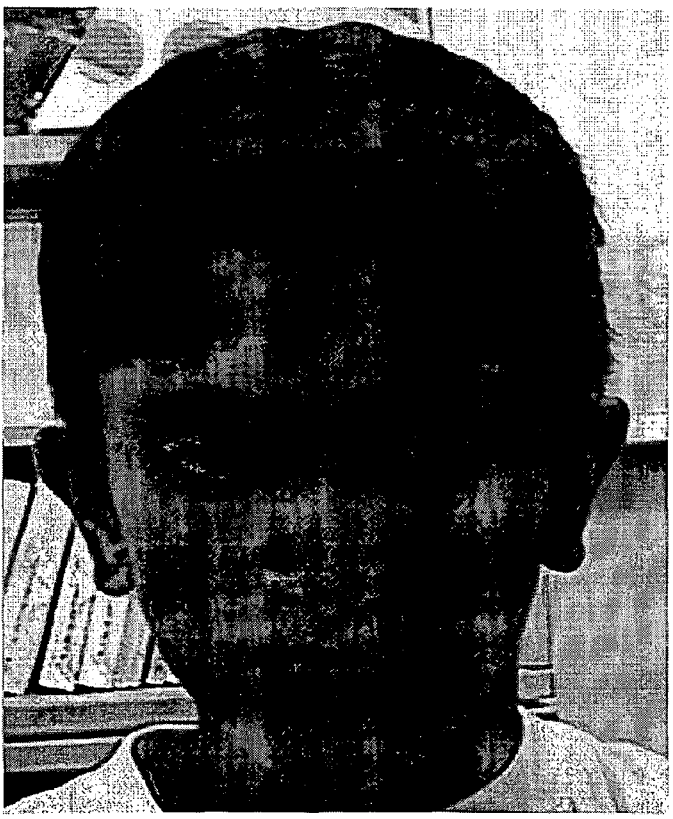

FIGS. 5a–5b through 8a–8b depict a result of respective iterations of one implementation of a stereo-coupled mechanism using epipolar geometry, where FIG. 3a–3b represents the two initial views of the same face. As can be seen in the last views in FIG. 8a–8b, the stereo-coupled model accurately locates each facial feature in the two different views, where the convergence of the facial features in the respective views is similar. This convergence is possible because the geometry constraint imposed on inner facial features (eyes, nose, and mouth) regulates the correspondence mapping between the two different views models.

Figure 9:
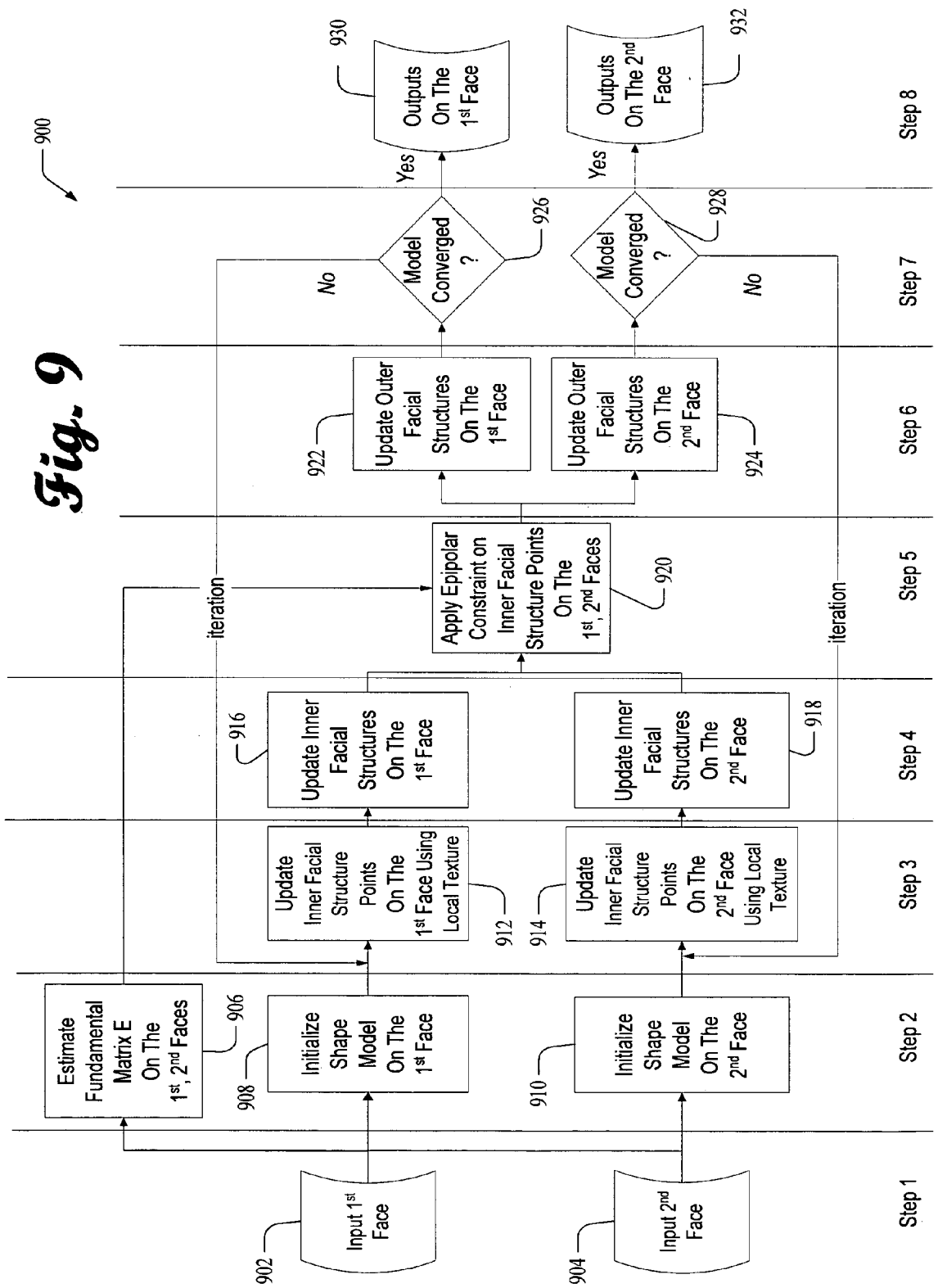
FIG. 9 is a flow diagram, in accordance with an implementation of the invention, of a procedure for facial feature detection that uses a stereo-coupling mechanism, where the procedure can be used on images seen in FIGS. 3a–3b to accomplish the respective iteration results seen in FIGS. 5a–5b through 8a–8b.

A procedure 900, seen in FIG. 9, illustrates one implementation of the present invention having steps one (1) through eight (8) that are performed upon two (2) different views of the same face using a face model. The two views are taken at the same relative camera orientation to the face, where the face is rotated in the yaw direction between the two different views. The two views are processed simultaneously. Steps two through seven are repeated in iterations within procedure 900.

The input to procedure 900 is two face images, an example of which is provided by FIGS. 3a–3b. This input is seen at step 1 in procedure 900 at blocks 902–904, respectively, for the 1st and second face (e.g., the two different views of the same face). After step 1 of procedure 900, step 2 proceeds in which the corner points of each facial feature on each face are detected in each of the two images by the initialization of the shape model on the first and second faces at blocks 908–910. Blocks 908–910 can be executed simultaneously. With respect to the inner facial features, the corner points for the mouth include a plurality of mouth corners. The corner points for each of the eyes include a plurality of eyes corners, and a corner point for the nose includes a nose tip.

Figure 5A:
FIGS. 5a–5b represents, in accordance with an implementation of the invention, a first iteration of a stereo-coupling mechanism for identifying the corresponding facial features on the two different views of FIGS. 3a–3b, respectively, by using epipolar geometry as encoded within a fundamental matrix.
Figure 5B:
Figure 6A:
FIGS. 6a–6b, 7a–7b, and 8a–8b represent respective iterations of the stereo-coupling mechanism as was used with respect to FIGS. 5a–5b.
Figure 6B:
Figure 7A:
Figure 7B:
Figure 8A:
Figure 8B:

After the corner points of each facial feature are detected, the initialization of the shape model on the first and second faces at blocks 908–910 also includes establishing the correspondences between the two sets of corner points. Stated otherwise, blocks 908–910 call for the initialization of first and second models for respective first and second face images. This initialization uses a face model having outer and inner facial features, where each facial feature is defined by a plurality points, and where each of the first and second models has outer and inner facial features. By way of example, FIGS. 5a–5b provide an example of the two different views upon which procedure 900 are applied. FIG. 2 provides an example of the face model having both inner and outer facial features, each of which is defined by a plurality of points. The inner facial features in FIG. 2 are a nose, a mouth and a pair of eyes. The outer facial features in FIG. 2 are an arcuate bottom edge of the face and a pair of eyebrows. As can be seen by the initial input of FIGS. 3a–3b, the first and second face images are the same face captured at the substantially the same respective camera orientation. The respective face poses of the first and second face images are substantially the same as to pitch, substantially the same as to roll, and different as to the yaw in a range from about 3 degrees to about 10 degrees (10°).

Following the establishment of correspondence between the corner points of the facial features in the two different views, an estimation is made of a fundamental matrix 'E' for the first and second faces (models) at block 906. Once example of a technique for estimating the fundamental matrix 'E' that can be used at block 905 of procedure 900 is described in Pentland et al., discussed above.

In step 3 of procedure 900, an update is made to the plurality of points for each of the inner facial feature of the first and second models (e.g., the first and second faces) by using the respective local texture for each point. This update occurs in blocks 912–914 of procedure 900, where the local texture for each point includes photometric data at or proximal to the point. In step 4, at blocks 916–918, an update is made to each of the inner facial features of the first and second models using the result of the updates to the points from step 3.

Steps 1–4 operate to update two different models, each representing a different view of the same face. In step 5, at block 920, a unitary operation is conducted instead of a pair of operations as in steps 1–4. Block 920 uses the fundamental matrix and the corresponding epipolar constraint in order to update the plurality of points for each of the inner facial features of the first and second models. Stated otherwise, the operations that are conducted at block 920 refine the updated first and second models by using two constraints that are expressed mathematically in eq. (3) and eq. (4), above.

Step 6 returns to conducting a pair of operations at blocks 922–924, where an update is made to each of the outer facial features of the first and second models. A pair of queries is conducted in the seventh step. These queries occur at blocks 926 and 928 for the first and second models, respectively. At block 926, if the first model has converged within a predetermined tolerance of the face model, a representation of the inner and outer facial features of the first face model is output. Otherwise, steps 3–7 are repeated until the convergence for the first model is within the predetermined tolerance of the face model. Similarly, at block 928, if the second model has converged within a predetermined tolerance of the face model, a representation of the inner and outer facial features of the second face model is output. Otherwise, steps 3–7 are repeated until the convergence for the second model is within the predetermined tolerance of the face model. An example of the result of four (4) iterations of steps 3–7 are seen, respectively, in FIGS. 5a–5b through 8a–8b.

Following the convergence of facial features between the two different views, the result of procedure 900 can be used in a face recognition process. For instance, identification can be made of the face of a person in a database that matches at least one of the first and second face images. Here, the matching process can uses the output representation of the inner and outer facial features of one or both of the first and second models.

A Computer System

FIG. 10 shows an exemplary computer system that can be used in the implementations described herein. Computer 1042 includes one or more processors or processing units 1044, a system memory 1046, and a bus 1048 that couples various system components including the system memory 1046 to processors 1044. The bus 1048 represents one or more of any of several types of bus structures, including a memory bus or memory controller, a peripheral bus, an accelerated graphics port, and a processor or local bus using any of a variety of bus architectures. The system memory 1046 includes read only memory (ROM) 1050 and random access memory (RAM) 1052. A basic input/output system (BIOS) 1054, containing the basic routines that help to transfer information between elements within computer 1042, such as during start-up, is stored in ROM 1050. Computer 1042 further includes a hard disk drive 1056 for reading from and writing to a hard disk (not shown), a magnetic disk drive 1058 for reading from and writing to a removable magnetic disk 1060, and an optical disk drive 1062 for reading from or writing to a removable optical disk 1064 such as a CD ROM or other optical media. The hard disk drive 1056, magnetic disk drive 1058, and optical disk drive 1062 are connected to the bus 1048 by an SCSI interface 1066 or some other appropriate interface. The drives and their associated computer-readable media provide nonvolatile storage of computer-readable instructions, data structures, program modules and other data for computer 1042. Although the exemplary environment described herein employs a hard disk, a removable magnetic disk 1060 and a removable optical disk 1064, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1056, magnetic disk 1060, optical disk 1064, ROM 1050, or RAM 1052, including an operating system 1070, one or more application programs 1072 (such as a design application), other program modules 1074, and program data 1076. A user may enter commands and information into computer 1042 through input devices such as a keyboard 1078 and a pointing device 1080. Other input devices (not shown) may include a microphone, joystick, game pad, satellite dish, scanner, or the like. These and other input devices are connected to the processing unit 1044 through an interface 1082 that is coupled to the bus 1048. A monitor 1084 or other type of display device is also connected to the bus 1048 via an interface, such as a video adapter 1086. In addition to the monitor, personal computers typically include other peripheral output devices (not shown) such as speakers and printers.

Computer 1042 commonly operates in a networked environment using logical connections to one or more remote computers, such as a remote computer 1088. The remote computer 1088 may be another personal computer, a server, a router, a network PC, a peer device or other common network node, and typically includes many or all of the elements described above relative to computer 1042. The logical connections depicted in FIG. 10 include a local area network (LAN) 1090 and a wide area network (WAN) 1092. Such networking environments are commonplace in offices, enterprise-wide computer networks, intranets, and the Internet. When used in a LAN networking environment, computer 1042 is connected to the local network through a network interface or adapter 1094. When used in a WAN networking environment, computer 1042 typically includes a modem 1096 or other means for establishing communications over the wide area network 1092, such as the Internet. The modem 1096, which may be internal or external, is connected to the bus 1048 via a serial port interface 1068. In a networked environment, program modules depicted relative to the personal computer 1042, or portions thereof, may be stored in the remote memory storage device. It will be appreciated that the network connections shown are exemplary and other means of establishing a communications link between the computers may be used.

Generally, the data processors of computer 1042 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein includes these and other various types of computer-readable storage media when such media contain instructions or programs for implementing the blocks described, in conjunction with a microprocessor or other data processor. The system described can also include the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Implementations enable the representation of facial features and the locating of points for the facial features, such as the eye corners, nose tips, etc. Correlation of the facial features for a pair of different views of the same face is found by using epipolar geometry. A mathematical model captures the shape variations on both inner facial features and the outer silhouette of the face. An algorithm uses a face model that is decomposed into inner and outer facial features in order to improve the matching of the facial features on the pair of different views of the same face.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for face modeling and identification of facial features, comprising:
   determining outer and inner facial features of a face model;
   initializing outer and inner facial features of the face model by taking images of a face to correspond to:
      that of a first model for a first face image of the face in a frontal position; and
      that of a second model for a second face image of the face moving in a yaw direction, wherein the first and the second face images are pictures taken at substantially the same respective camera orientation;
   matching outer and inner facial features by a correlation between the first face image and the second face image;
   adjusting the matching outer and inner facial features of the first and the second models using the corresponding epipolar constraint for the first and the second models for a more accurate correlation of facial features between the first face image and the second face image; and
   identifying facial features for face recognition.

2. The method as defined in claim 1, wherein:
   the inner facial features comprise a nose, a mouth and a pair of eyes; and
   the outer facial features comprise an arcuate bottom edge of the face and a pair of eyebrows.

3. The method as defined in claim 1, wherein a plurality points correspond to each said inner facial feature and comprise:
   a plurality of mouth corners corresponding to the mouth;
   a plurality of eyes corners corresponding to the eye; and
   a nose tip corresponding to the nose.

4. The method as defined in claim 1, wherein the first and second face images are the same face captured at the substantially the same respective camera orientation.

5. The method as defined in claim 4, wherein the respective face poses of the first and second face images are:
   substantially the same as to pitch;
   substantially the same as to roll; and
   different as to yaw in a range from about 3 degrees to about 10 degrees.

6. The method as defined in claim 1, wherein the first and second face images are pictures taken at the substantially the same respective camera orientation of the same face in substantially the same face pose range but differing by the yaw.

7. The method as defined in claim 1, wherein the face pose range differs in the first and second face images by a yaw difference of not more than about ten degrees (10°).

8. The method as defined in claim 1, wherein:
   the first face image is a full frontal picture of a human face; and
   the second face image differs from the first face image by a yaw of not more than about ten degrees (10°).

9. The method as defined in claim 1, further comprising outputting a representation of each of the first and second models, each including the respective inner and outer facial features.

10. The method as defined in claim 9, wherein the outputting further comprises:
    repeating the matching and the adjusting until each match of the outer and inner facial features on:
       the first model is not greater than a predetermined convergence toleration with respect to that of the face model; and
       the second model is not greater than a predetermined convergence toleration with respect to that of the face model.

11. The method as defined in claim 1, further comprising repeating the matching and the adjusting until each said match of the outer and inner facial features on:
    the first model is not greater than a predetermined convergence toleration with respect to that of the face model; and
    the second model is not greater than a predetermined convergence toleration with respect to that of the face model.

12. The method as defined in claim 1, further comprising identifying the face of a person in a database that matches at least one of the first and second face images by using the respective outer and inner facial features of the first and second models.

13. A computer readable medium comprising instructions that, when executed, perform the method of claim 1.

14. A method comprising:
    determining outer and inner facial features of a face model, each being represented by plurality of points;
    initializing outer and inner facial features of the face model by taking images of a face to correspond to:
       that of a first model for a first face image of the face in a frontal position; and
       that of a second model for a second face image of the same face moving in a yaw direction;
    matching outer and inner facial features by a correlation between the first face image and the second face image;
    adjusting the plurality of points for each matching outer and inner facial features of the first and second models using the corresponding epipolar constraint for the first and second models for a more accurate correlation of facial features between the first face image and the second face image;
    repeating the matching and the adjusting until:
    a majority of the points for each of the outer and inner facial features on the first model that matches that of the face model has a relative offset there between of not greater than a predetermined convergence toleration; and
    a majority of the points for each of the outer and inner facial features on the second model that matches that of the face model has a relative offset there between not greater than the predetermined convergence toleration;
    outputting the first and the second model that has a relative offset there; and
    identifying facial features for face recognition.

15. The method as defined in claim 14, further comprising outputting a representation of each of the first and second models, each including the respective inner and outer facial features.

16. The method as defined in claim 14, wherein:
    the inner facial features comprise a nose, a mouth and a pair of eyes; and the outer facial features comprise an arcuate bottom edge of the face and a pair of eyebrows.

17. The method as defined in claim 14, wherein the plurality points and corresponding inner facial features are selected from the group consisting of:
a plurality of mouth corners corresponding to a mouth;
a plurality of eyes corners corresponding to an eye; and
a nose tip corresponding to a nose.

18. The method as defined in claim 14, wherein the first and second face images are the same face captured at the substantially the same respective camera orientation.

19. The method as defined in claim 18, wherein the respective face poses of the first and second face images are:
substantially the same as to pitch;
substantially the same as to roll; and
different as to yaw in a range from about 3 degrees to about 10 degrees.

20. The method as defined in claim 14, wherein the first and second face images are pictures taken at the substantially the same respective camera orientation of the same face in substantially the same face pose range but differing by the yaw.

21. The method as defined in claim 14, wherein the face pose range differs in the first and second face images by a yaw difference of not more than about ten degrees (10°).

22. The method as defined in claim 14, wherein:
the first face image is a full frontal picture of a human face; and
the second face image differs from the first face image by a yaw of not more than about ten degrees (10°).

23. The method as defined in claim 14, further comprising identifying the face of a person in a database that matches at least one of the first and second face images by using the points that respectively correspond to the outer and inner facial features of the first and second models.

24. A computer readable medium comprising instructions that, when executed, perform the method of claim 14.

25. A method comprising the steps of:
determining outer and inner facial features of a face model;
initializing, using a face model having outer and inner facial features wherein each of the outer and inner facial features includes a plurality of points, first and second models for respective first and second face images, wherein a first model is for a first image of a face in a frontal position and a second model is for a second image of the face moving in a yaw direction;
estimating a fundamental matrix for the first and second models;
updating the plurality of points for each inner facial features of the first and second models by using the respective local texture for each said point;
updating each inner facial features of the first and second models;
updating, using the fundamental matrix and the corresponding epipolar constraint, the plurality of points for each of the inner facial features of the first and second models; and
updating each said outer facial features of the first and second models
wherein the updating is for a more accurate correlation of facial features between the first face image and the second face image; and
identifying facial features for facial recognition.

26. The method as defined in claim 25, wherein the steps further comprise:
if the first model has converged within a predetermined tolerance of the face model, outputting a representation of the inner and outer facial features of the first model, otherwise repeating the four updating steps for the first model; and
if the second model has converged within a predetermined tolerance of the face model, outputting a representation of the inner and outer facial features of the second model, otherwise repeating the four updating steps for the second model.

27. The method as defined in claim 25, wherein:
the inner facial features comprise a nose, a mouth and a pair of eyes; and the outer facial features comprise an arcuate bottom edge of the face and a pair of eyebrows.

28. The method as defined in claim 27, wherein the plurality of points corresponding to the inner facial features of:
the mouth comprises a plurality of mouth corners;
each eye comprises a plurality of eyes corners; and
the nose comprises a nose tip.

29. The method as defined in claim 25, wherein the first and second face images are the same face captured at the substantially the same respective camera orientation.

30. The method as defined in claim 29, wherein the respective face poses of the first and second face images are:
substantially the same as to pitch;
substantially the same as to roll; and
different as to yaw in a range from about 3 degrees to about 10 degrees.

31. The method as defined in claim 25, wherein the first and second face images are pictures taken at the substantially the same respective camera orientation of the same face in substantially the same face pose range but differing by the yaw.

32. The method as defined in claim 25, wherein the face pose range differs in the first and second face images by a yaw difference of not more than about ten degrees (10°).

33. The method as defined in claim 25, wherein:
the first face image is a full frontal picture of a human face; and
the second face image differs from the first face image by a yaw of not more than about ten degrees (10°).

34. The method as defined in claim 25, wherein the local texture for each said point comprises photometric data at or proximal to the point.

35. The method as defined in claim 25, further comprising identifying the face of a person in a database that matches at least one of the first and second face images by using, respectively, the output representation of the inner and outer facial features of:
the first model; and
the second model.

36. A computer readable medium comprising instructions that, when executed, perform the method of claim 25.

37. An apparatus comprising:
memory including:
one or more programs;
outer and inner facial features of a face model, each being represented by a plurality of points;
a first face image of a face in a frontal position; and
a second face image of the face moving in a yaw direction;
one or more processors configured to execute one or more programs in the memory to perform actions comprising;

match the plurality of points of the outer and inner facial features of the face model with:
that of a first model for the first face image of the face in the frontal position; and
that of a second model for the second face image of the face moving in a yaw direction;
adjust the plurality of points for each matching outer and inner facial features of the first and the second models using the corresponding epipolar constraint for the first and the second models for a more accurate correlation of facial features between the first face image and the second face image;
repeat the match and adjust steps until:
a majority of the points for each of the outer and inner facial features on the first model that matches that of the face model has a relative offset there between of not greater than a predetermined convergence toleration; and
a majority of the points for each of the outer and inner facial features on the second model that matches that of the face model has a relative offset there between not greater than the predetermined convergence toleration; and
a monitor to display the facial features for face recognition.

38. The apparatus as defined in claim 37, wherein the steps further comprise outputting a representation of each of the fast and second models, each including the respective inner and outer facial features.

39. The apparatus as defined in claim 37, wherein:
the inner facial features comprise a nose, a mouth and a pair of eyes; and
the outer facial features comprise an arcuate bottom edge of the face and a pair of eyebrows.

40. The apparatus as defined in claim 37, wherein the plurality points and corresponding said inner facial feature are selected from the group consisting of:
a plurality of mouth corners corresponding to a mouth;
a plurality of eyes corners corresponding to an eye; and
a nose tip corresponding to a nose.

41. The apparatus as defined in claim 37, wherein the first and second face images are the same face captured at the substantially the same respective camera orientation.

42. The apparatus as defined in claim 41, wherein the respective face poses of the first and second face images are:
substantially the same as to pitch;
substantially the same as to roll; and
different as to yaw in a range from about 3 degrees to about 10 degrees.

43. The apparatus as defined in claim 37, wherein the first and second face images are pictures taken at the substantially the same respective camera orientation of the same face in substantially the same face pose range but differing by the yaw.

44. The apparatus as defined in claim 37, wherein the face pose range differs in the first and second face images by a yaw difference of not more than about ten degrees (10°).

45. The apparatus as defined in claim 37, wherein:
the first face image is a frill frontal picture of a human face; and
the second face image differs from the first face image by a yaw of not more than about ten degrees (10°).

46. An apparatus comprising:
means for initializing, using a face model having outer and inner facial features each including a plurality of points, first and second models for respective first and second face images, wherein a first model is for a first face image of a face in a frontal position and a second model is for a second face image of the face moving in a yaw direction;
means for generating the first face image and the second face image with a camera;
means for estimating a fundamental matrix for the first and second models;
means for updating the plurality of points for each said inner and outer facial feature of the first and second models by using the respective local texture for each said point;
means for updating each said inner facial feature of the first and second models;
means for updating, using the fundamental matrix and the corresponding epipolar constraint, the plurality of points for each of the inner facial features of the first and second models; and
means for updating, using the plurality of points for each of the inner facial features of the first and second models, each said outer facial feature of the first and second models,
wherein the updating is for a more accurate correlation of facial features between the first face image and the second face image; and
means for displaying on a monitor used for facial recognition.

47. The apparatus as defined in claim 46, further comprising:
means, if a majority of the points for each of the outer and inner facial features on the first model that matches that of the face model has a relative offset there between of not greater than a predetermined convergence toleration, for outputting a representation of the inner and outer facial features of the first model; and
means, if a majority of the points for each of the outer and inner facial features on the first model that matches that of the face model has a relative offset there between not greater than the predetermined convergence toleration, for outputting a representation of the inner and outer facial features of the second model.

48. The apparatus as defined in claim 46, wherein:
the inner facial features comprise a nose, a mouth and a pair of eyes; and
the outer facial features comprise an arcuate bottom edge of the face and a pair of eyebrows.

49. The apparatus as defined in claim 48, wherein the plurality points corresponding to the inner facial feature of:
the mouth comprises a plurality of mouth corners;
each said eye comprises a plurality of eyes corners; and
the nose comprises a nose tip.

50. The apparatus as defined in claim 46, wherein the first and second face images are the same face captured at the substantially the same respective camera orientation.

51. The apparatus as defined in claim 46, wherein the respective face poses of the first and second face images are:
substantially the same as to pitch;
substantially the same as to roll; and
different as to yaw in a range from about 3 degrees to about 10 degrees.

52. The apparatus as defined in claim 46, wherein the first and second face images are pictures taken at the substantially the same respective camera orientation of the same face in substantially the same face pose range but differing by the yaw.

53. The apparatus as defined in claim 46, wherein the face pose range differs in the first and second face images by a yaw different of not more than about ten degrees (10°).

54. The apparatus as defined in claim 46, wherein:
the first face image is a full frontal picture of a human face; and
the second face image differs from the first face image by a yaw of not more than about ten degrees (10°).

55. The apparatus as defined in claim 46, wherein the local texture for each said point comprises photometric data at or proximal to the point.

* * * * *